United States Patent
Jang

(10) Patent No.: US 9,830,707 B2
(45) Date of Patent: Nov. 28, 2017

(54) APPARATUS AND METHOD FOR GENERATING DEPTH MAP

(71) Applicant: ELECTRONICS AND TELECOMMUNICATIONS RESEARCH INSTITUTE, Daejeon (KR)

(72) Inventor: Kyung-Ho Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 123 days.

(21) Appl. No.: 15/019,738

(22) Filed: Feb. 9, 2016

(65) Prior Publication Data

US 2016/0253811 A1 Sep. 1, 2016

(30) Foreign Application Priority Data

Feb. 27, 2015 (KR) .................... 10-2015-0028600

(51) Int. Cl.
*G06K 9/00* (2006.01)
*G06T 7/00* (2017.01)
*G06T 7/50* (2017.01)

(52) U.S. Cl.
CPC .............. *G06T 7/0051* (2013.01); *G06T 7/50* (2017.01)

(58) Field of Classification Search
CPC G06T 7/50; G06T 7/0051; G06T 7/60; G06T 7/251; G06T 7/004; H04N 13/026; H04N 2013/0081; H04N 13/0018; G06K 9/46; G06K 2009/4666

See application file for complete search history.

(56) References Cited

U.S. PATENT DOCUMENTS

| | | | |
|---|---|---|---|
| 7,102,633 B2 | 9/2006 | Kaye et al. | |
| 2010/0085425 A1* | 4/2010 | Tan ...................... | H04N 9/3194 348/54 |
| 2012/0163733 A1 | 6/2012 | Yoon et al. | |
| 2012/0306876 A1* | 12/2012 | Shotton ................... | G06T 17/10 345/424 |

(Continued)

FOREIGN PATENT DOCUMENTS

| | | |
|---|---|---|
| KR | 10-2012-0087754 A | 8/2012 |
| KR | 10-2013-0114420 A | 10/2013 |
| KR | 10-2014-0080716 A | 7/2014 |

OTHER PUBLICATIONS

Jonathan Shade et al, "Layered Depth Images", SIGGRAPH 98, pp. 231-242, Jul. 19-24, 1998.

*Primary Examiner* — Yon Couso
(74) *Attorney, Agent, or Firm* — LRK Patent Law Firm

(57) ABSTRACT

A apparatus for generating a depth map includes a cube space setting unit configured to set cube space based on camera intrinsic parameters; a layer generating unit configured to extract objects from a planar image and generate a layer including each object; a layer editing unit configured to apply at least one of parallel translation and rotation in a depth direction for the layer based on at least one of translation input and rotation input; and a model projecting unit configured to place a model on the layer, set a depth value for a model area placed on an object area included in the layer as a depth value of the object and generate a depth map comprising the depth value corresponding to each layer.

8 Claims, 8 Drawing Sheets

(56) References Cited

U.S. PATENT DOCUMENTS

2013/0266212 A1 10/2013 Kim et al.
2014/0152699 A1* 6/2014 Oh .......................... G06T 13/80
                                                                  345/635

* cited by examiner

APPARATUS AND METHOD FOR GENERATING DEPTH MAP

CROSS REFERENCE TO RELATED APPLICATION(S)

This application claims the benefit under 35 USC §119(a) of Korean Patent Application No. 10-2015-0028600 filed on Feb. 27, 2015 in the Korean Intellectual Property Office, the entire disclosure of which is incorporated herein by reference for all purposes.

BACKGROUND

1. Field

The following description relates to a technology for generating a depth map of a planar image.

2. Description of Related Art

In accordance with the development of stereoscopy devices such as 3D TVs, a demand far stereoscopic images is increasing and technologies for generating stereoscopic images have thus become important. The conversion of image data from existing 2D to 3D has more economical, compared to generation of new 3D image data.

The conversion of 2D into 3D is to first separate objects from 2D and generate a depth map of each object, and then create images from a view point based on this depth map to provide a 3D image.

Here, a process of generating mesh by manually adding control points for objects extracted from a 2D image through a rotoscoping method and manually providing a depth for each control point in order to generate a depth map is required.

SUMMARY

This summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One or more examples may provide an apparatus for generating a depth map by setting 3D space based on camera information, generating a layer including a 2D object extracted from the space, and mapping a model on the layer to generate a depth map.

According to one general aspect, an apparatus for generating a depth map includes a cube space setting unit configured to set cube space based on camera intrinsic parameters; a layer generating unit configured to extract objects from a planar image and generate a layer including each object; a layer editing unit configured to apply at least one of parallel translation and rotation in a depth direction for the layer based on at least one of translation input and rotation input; and a model projecting unit configured to place a model on the layer, set a depth value for a model area placed on an object area included in the layer as a depth value of the object and generate a depth map including the depth value corresponding to each layer.

The layer generating unit may set a depth of the layer to a predetermined depth.

The cube space setting unit may set space corresponding to a hexahedron in which a maximum plane positioned at the maximum depth is opposed to a minimum plane positioned at the minimum depth according to the camera intrinsic parameters as the cube space.

The layer editing unit may change depths of the maximum plane and the minimum plane according to plane translation input requesting for changing depth of at least one of the maximum plane and the minimum plane, and re-set the cube space to be corresponded to the maximum plane and the minimum plane.

According to another general aspect, a method for generating a depth map includes: setting cube space based on camera intrinsic parameters; extracting objects from a planar image and generating a layer including each object; applying at least one of parallel translation and rotation in a depth direction for the layer based on at least one of translation input and rotation input; placing a model on the layer and setting a depth value for a model area placed on an object area included in the layer as a depth value of the object; and generating a depth map comprising the depth value corresponding to each layer.

The method for generating a depth map may further include setting a depth of the layer to a predetermined depth.

The step for setting cube space based on camera intrinsic parameters may include setting space corresponding to a hexahedron in which a maximum plane positioned at the maximum depth is opposed to a minimum plane positioned at the minimum depth according to the camera intrinsic parameters as the cube space.

The method for generating a depth map may further include changing depths of the maximum plane and the minimum plane according to plane translation input requesting for changing depth of at least one of the maximum plane and the minimum plane, and re-setting the cube space to be corresponded to the maximum plane and the minimum plane.

The following description may allow a relative stereoscopic depth between layers intuitionally by arranging each layer on a 3 dimension.

The following description may also provide various depth information since a model can be mapped in each layer.

Other features and aspects will be apparent from the following detailed description, the drawings, and the claims.

Figure 1:
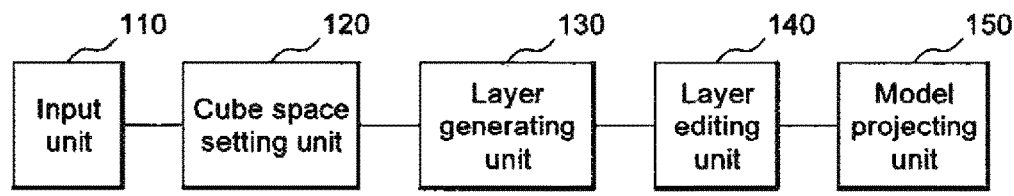
FIG. 1 is a diagram illustrating an example of an apparatus for generating a depth map.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

It will be understood that when an element is referred to as being "transmitted" to another element, it can be directly transmitted to the other element or intervening elements may be present.

Figure 2:
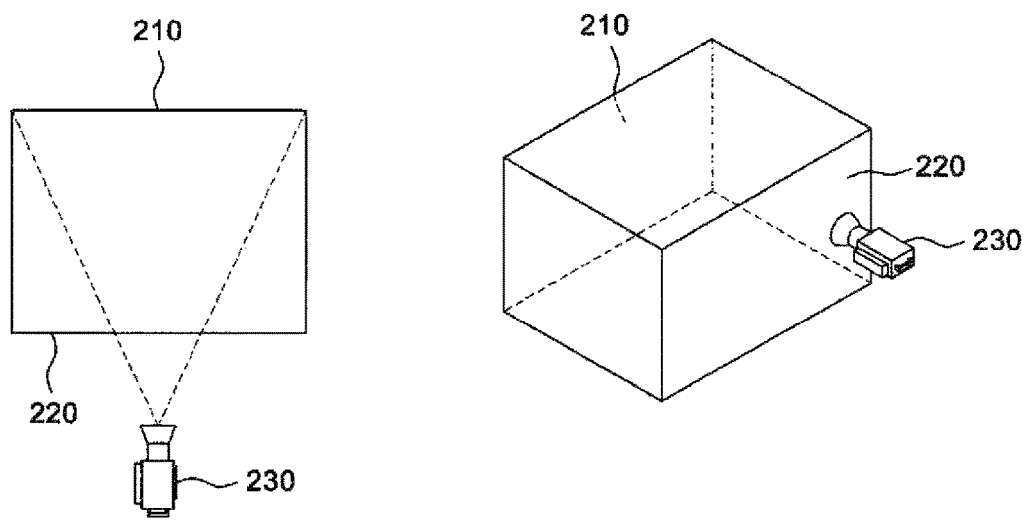
FIG. 2 is a diagram illustrating cube space set by an example of an apparatus for generating a depth map.
Figure 3:
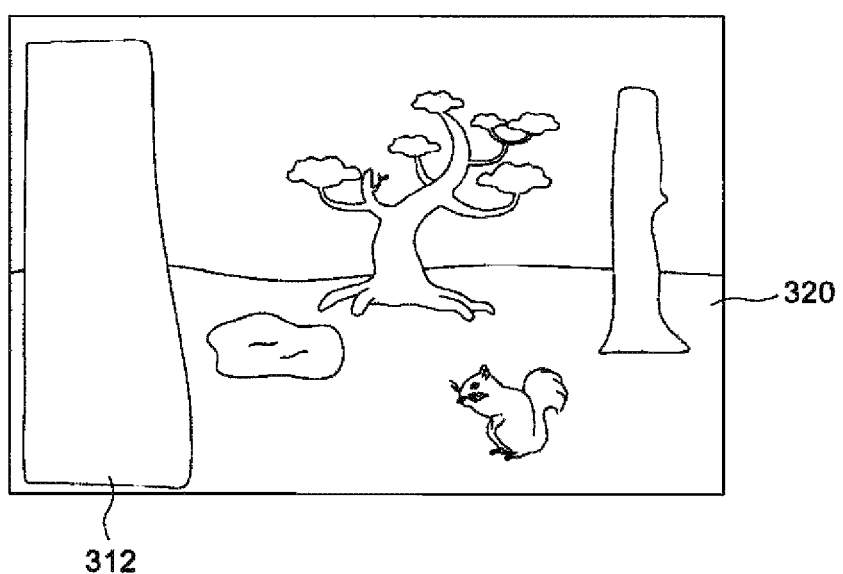
FIG. 3 is a diagram illustrating objects extracted by an example of an apparatus for generating a depth map.
Figure 4:
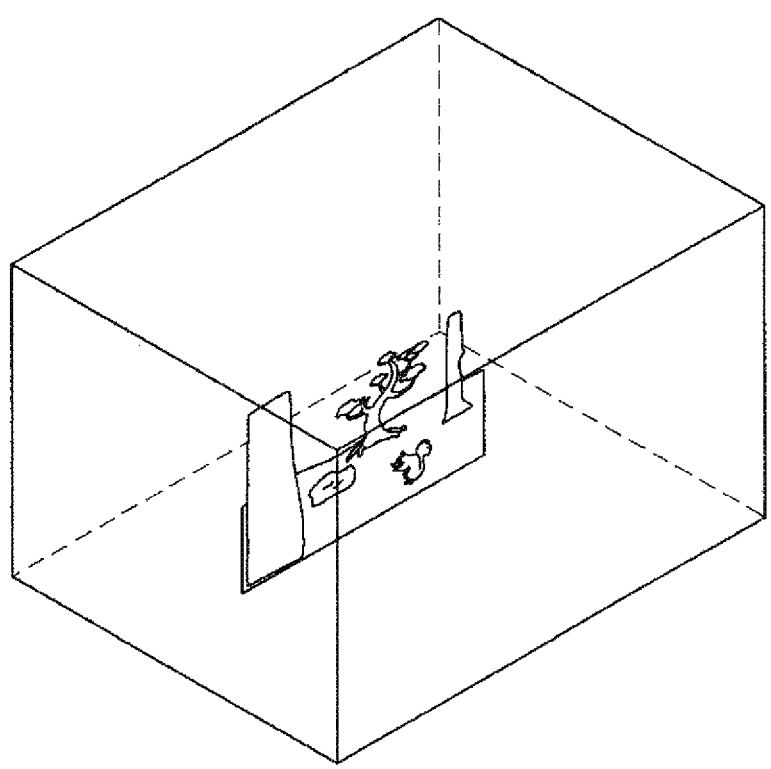
FIG. 4 is a diagram illustrating a layer initially arranged in cube space by an example of an apparatus for generating a depth map.
Figure 5:
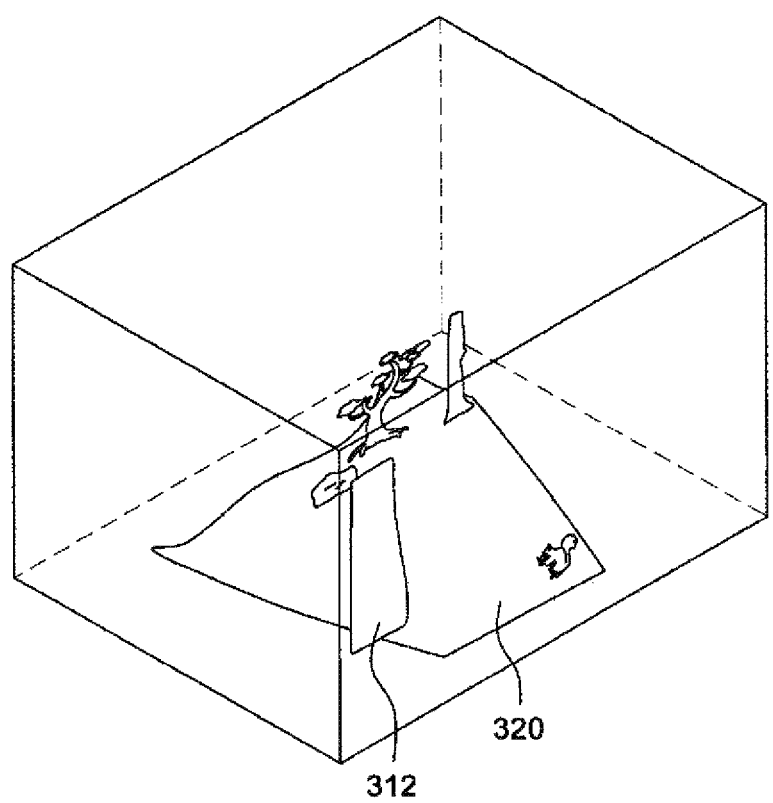
FIG. 5 is a diagram illustrating a layer translated and rotated by an example of an apparatus for generating a depth map.
Figure 6:
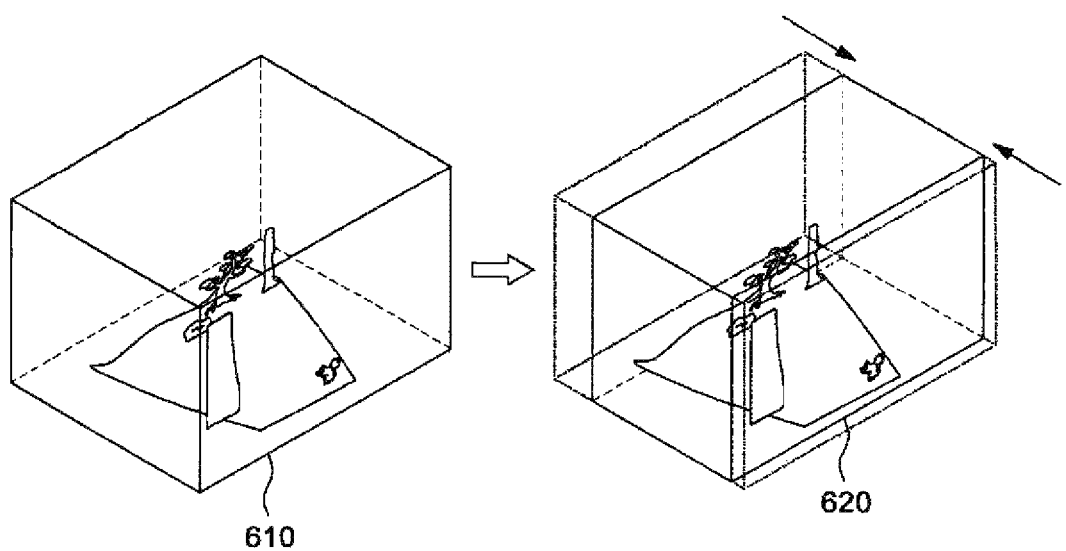
FIG. 6 is a diagram illustrating cube space re-set by an example of an apparatus for generating a depth map.
Figure 7:
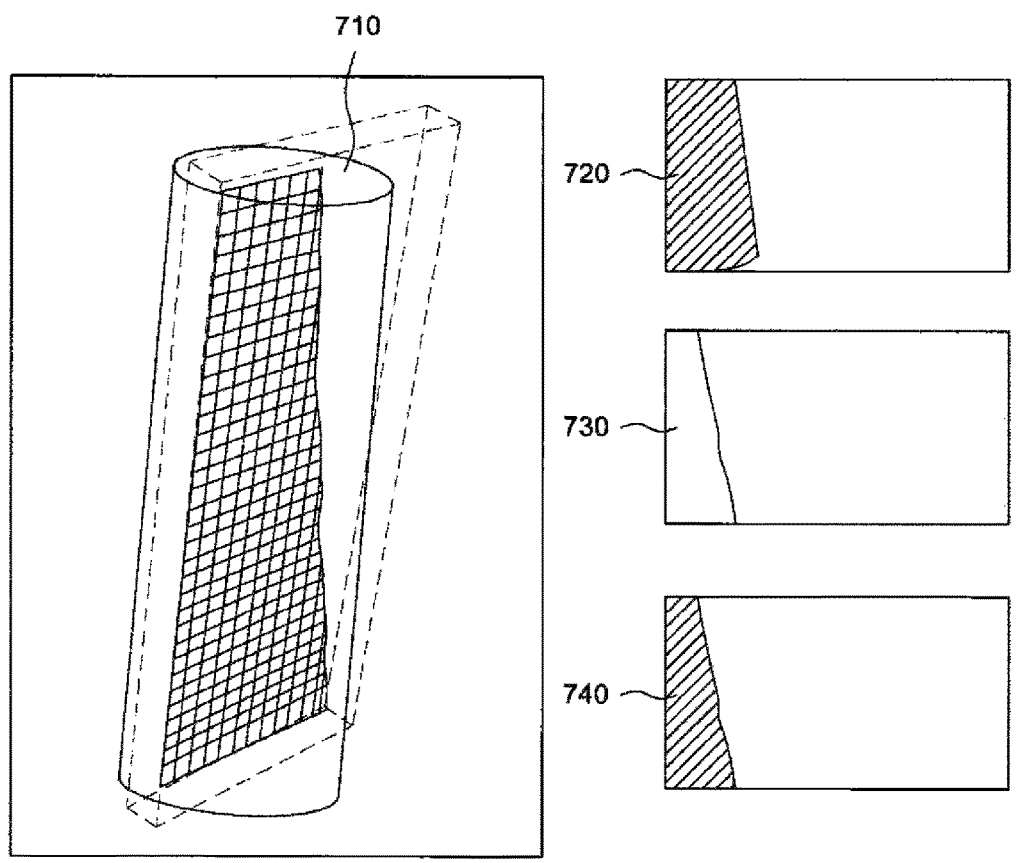
FIG. 7 is diagrams illustrating a model placed on the layer and a process for setting a depth value of an object by an example of an apparatus for generating a depth map.

FIG. 1 is a diagram illustrating an example of an apparatus for generating a depth map, FIG. 2 is a diagram illustrating cube space set by an example of an apparatus for generating a depth map, FIG. 3 is a diagram illustrating objects extracted by an example of an apparatus for generating a depth map, FIG. 4 is a diagram illustrating a layer initially arranged in cube space by an example of an apparatus for generating a depth map, FIG. 5 is a diagram illustrating a layer translated and rotated by an example of an apparatus for generating a depth map, FIG. 6 is a diagram illustrating cube space re-set by an example of an apparatus for generating a depth map, and FIG. 7 is diagrams illustrating a model placed on the layer and a process for setting a depth value of an object by an example of an apparatus for generating a depth map.

Referring to FIG. 1, an apparatus for generating a depth map according to an example may include an input unit 110, a cube space setting unit 120, a layer generating unit 130, a layer editing unit 140, and a model projecting unit 150.

The input unit 110 may receive a planar image from an external device, such as, for example, a camera, a terminal, a storage medium and the like, through a predetermined protocol. Here, the planar image is an image including a value for color of a single pixel but not including a depth value of a single pixel. The input unit 110 may transmit the planar image to the layer generating unit 130.

The cube space selling unit 120 may set cube space corresponding to the camera which has generated the planar image. For example, the cube space setting unit 120 may convert positions of the four vertices of the planar image into a world coordinate system based on camera intrinsic parameter information including center point position and a focal length of the camera (for example, 230 of FIG. 2). The cube space setting unit 120 may also receive the maximum depth and the minimum depth that each layer can be located from a user. The cube space setting unit 120 may calculate the maximum plane (for example, 210 of FIG. 2) located at the maximum depth. The cube space setting unit 120 may also calculate the minimum plane (for example, 220 of FIG. 2) located at the minimum depth. The cube space setting unit 120 may set a hexahedron space in which the maximum plane is opposed to the minimum plane as a cube space. The cube space setting unit 120 may transmit the cube space information which is the information represent the cube space to the layer generating unit 130.

The layer generating unit 130 may extract objects from the planar image and generate a layer for each object. The layer generating unit 130 may arrange the layer of each object in a predetermined depth on the cube space. For example, the layer generating unit 130 may extract one or more objects from the planar image and generate a layer for each object (for example, generate a layer for an object 312 in FIG. 3). The layer generating unit 130 may arrange the layer of each object in a predetermined depth. The each layer may be overlapped in the predetermined depth as shown in FIG. 4. The layer generating unit 130 may generate layer information including the cube space information and depth information of each layer and send the result to the layer editing unit 140.

The layer editing unit 140 may receive an input to translate each layer (hereinafter, referred to as translation input) and an input to rotate each layer (hereinafter, referred to as rotation input) from a user and apply at least one of translation and rotation to each layer based on the translation input and the rotation input. For example, the layer editing unit 140 may translate in parallel each plane layer in a depth direction not to change the direction of the normal vector based on the translation input and rotate each layer to change the direction of the normal vector of each layer based on the rotation input. The layer editing unit 140 may change a depth of the layer including the object 312 from a predetermined depth to a depth based on the translation input as shown in FIG. 5. The layer editing unit 140 may also rotate the layer including the object 320 of FIG. 3 to change a normal vector direction of the layer including the object 320 as shown in FIG. 5.

The layer editing unit 140 may receive an input requesting for change of at least one depth of the maximum plane and the minimum plane (hereinafter, referred to as plane translation input) from a user to change at least one depth of the maximum plane and the minimum plane based on the plane translation input. For example, the layer editing unit 140 may change at least one depth of the maximum plane and the minimum plane of the cube space which is first automatically set as in 610 of FIG. 6 to 620. The layer editing unit 140 may thus control a depth value of the entire layers based on the plane translation input.

The model projecting unit 150 may select one model from one or more predetermined models for at least one layer, place the model on a layer, and set a depth value for a model area placed on an object area included in the layer as a depth value of the object. That is the model projecting unit may set an object area of each layer as a mask and set a depth value of a model area placed in the mask as a depth value of the object. The depth map generating unit may not only set a depth value by translating and rotating the plane through the layer editing unit 140 but also set a detailed depth value of each object through the model projecting unit 150. Here, the model projecting unit 150 may store at least one model including the depth value and receive an input to select one mode from one or more models for each layer from a user. For example, the model projecting unit 150 may select a cylindrical model 710 as in FIG. 7 and place the model on a layer. The model projecting unit 150 may set a depth value of a model area placed on an object area included in the layer as a depth value of the object so that the depth value of the object may be set to be the object in a cylindrical shape. When a mask of an object (730 of FIG. 7) area is placed on a model 720 having a depth value, the model projecting unit 150 may set the depth value corresponding to the model area placed in the mask as a depth value of the object.

The model projecting unit 150 may set a depth value of each layer according to models and generate a depth map including the depth value of each layer.

Figure 8:
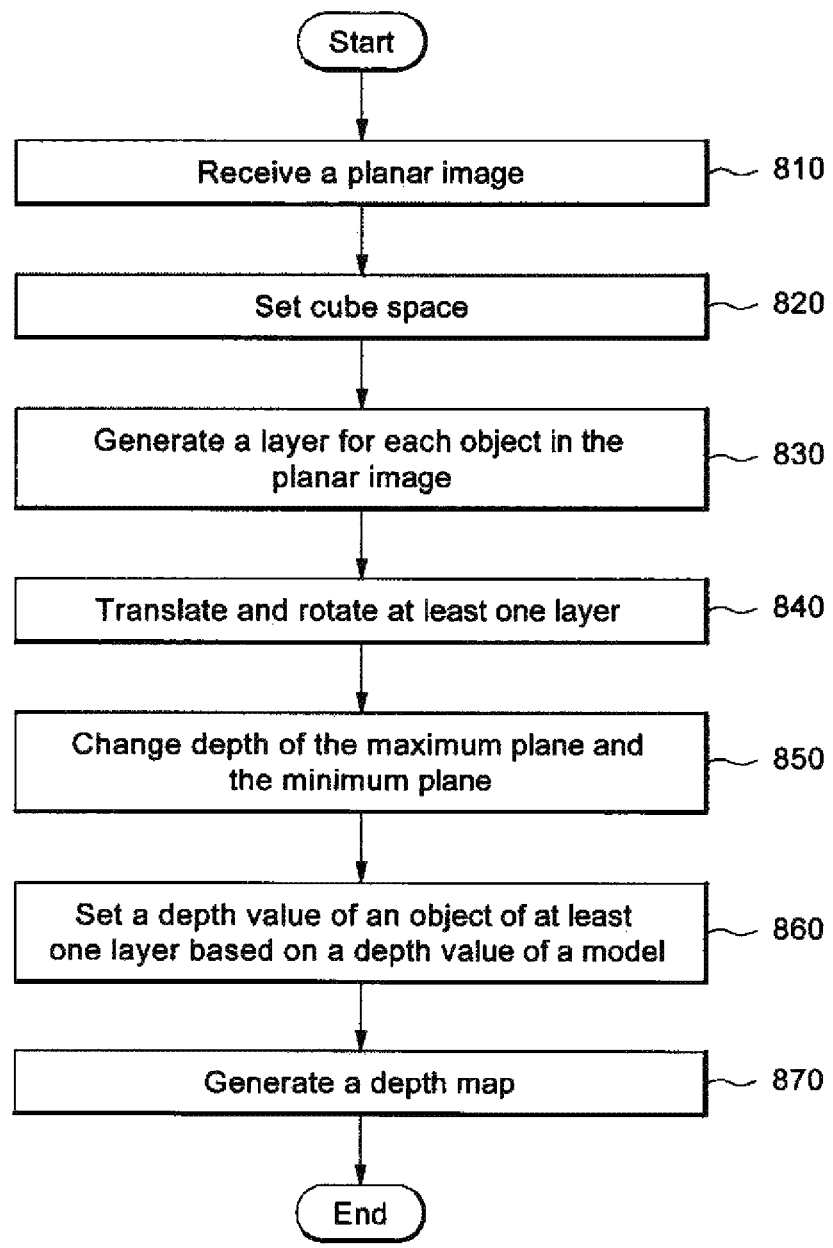
FIG. 8 is a flowchart illustrating an example of a method for generating a depth map.

FIG. 8 is a flowchart illustrating an example of a method for generating a depth map.

Referring to FIG. 8, an apparatus for generating a depth map may receive a planar image from an external device in S810.

The apparatus for generating a depth map may set cube space according to camera intrinsic parameter information in S820. For example, the apparatus for generating a depth map may convert positions of the four vertices of the planar image into a world coordinate system according to position and angle of view of a camera with reference to the camera intrinsic parameter information. The apparatus for generating a depth map may also calculate a maximum depth of a plane according to the coordinate of the four vertices and then calculate a maximum plane located in a maximum depth. The apparatus for generating a depth map may also set a minimum depth and then calculate a minimum plane located in the minimum depth. The apparatus for generating a depth map may set space corresponding to a hexahedron, in which the maximum plane is opposed to the minimum plane, as cube space.

The apparatus for generating a depth map may generate a layer for each object in the planar image in S830. The apparatus for generating a depth map may extract at least one object from the planar image and generate a layer for the each object. Here, the apparatus for generating a depth map may arrange the layer for the each object in a predetermined depth.

The apparatus for generating a depth map may translate and rotate at least one layer according to translation input and rotation input in S840. The apparatus for generating a depth map may translate each plane layer in parallel in a depth direction not to change the direction of the normal vector based on the translation input and rotate each layer to change the direction of the normal vector of the each layer based on the rotation input.

The apparatus for generating a depth map may change depth of the maximum plane and the minimum plane on the cube space according to users plane translation input. The apparatus for generating a depth map may thus change the cube space based on the plane translation input.

The apparatus for generating a depth map may set a depth value of an object of at least one layer based on a depth value of a model in S860. That is, the apparatus for generating a depth map may select one model from one or more predetermined models for the layer, place the model on the layer, and set a depth value of a model area placed on an object area included in the layer as a depth value of the object.

The apparatus for generating a depth map may generate a depth map including the depth value of the object of each layer in S870.

Figure 9:
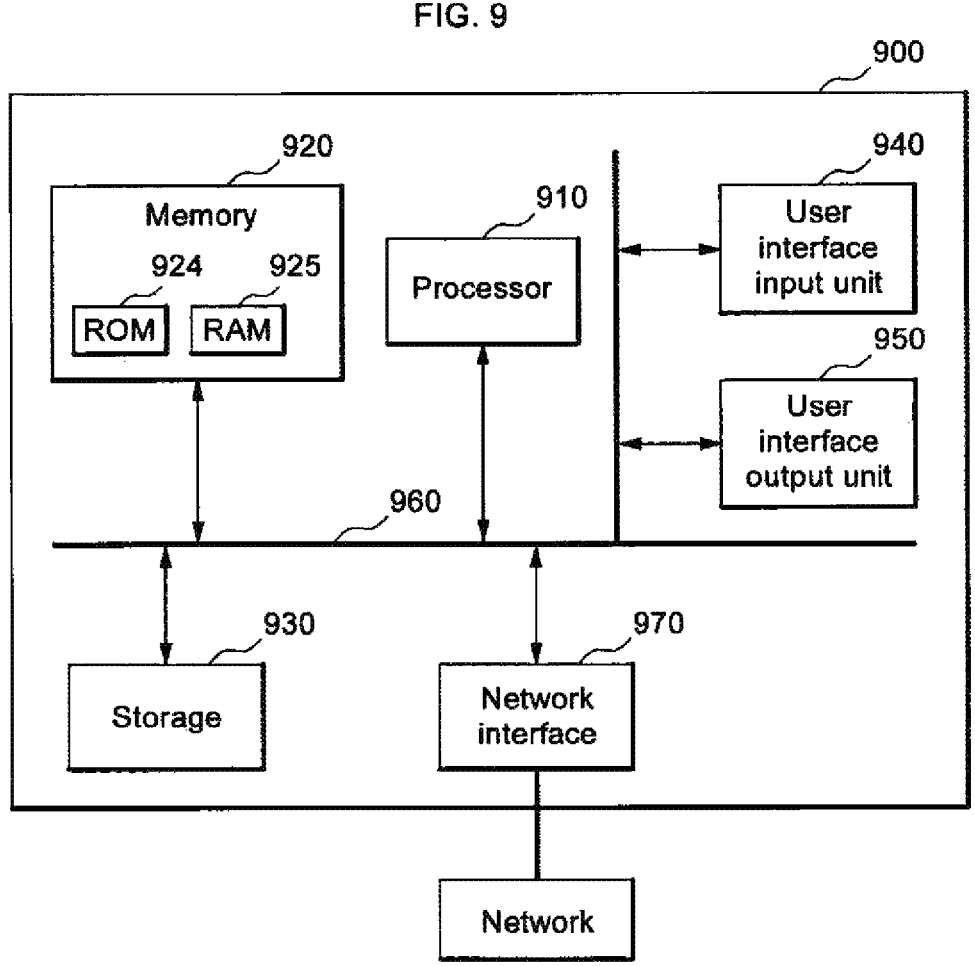
FIG. 9 is a diagram illustrating a computer system in which an example of an apparatus for generating a depth map is implemented.

FIG. 9 is a diagram illustrating a computer system in which an example of an apparatus for generating a depth map is implemented.

Exemplary embodiments of the present disclosure may be implemented in a computer system, for example, a computer readable recording medium. As shown in FIG. 9, a computer system 900 may include at least one of at least one processor 910, a memory 920, a storing unit 930, a user interface input unit 940 and a user interface output unit 950, which may communicate through a bus 960. The computer system 900 may further include a network interface 970 to connect to a network. The processor 910 may be a CPU or semiconductor device which executes processing commands stored in the memory 920 and/or the storing unit 930. The memory 920 and the storing unit 930 may include various types of volatile/non-volatile storage media. For example, the memory may include ROM 924 and RAM 925.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for generating a depth map, comprising:
   a cube space setting unit configured to set cube space based on camera intrinsic parameters;
   a layer generating unit configured to extract objects from a planar image and generate a layer including each object;
   a layer editing unit configured to apply at least one of parallel translation and rotation in a depth direction for the layer based on at least one of translation input and rotation input; and
   a model projecting unit configured to place a model on the layer, set a depth value for a model area placed on an object area included in the layer as a depth value of the object and generate a depth map comprising the depth value corresponding to each layer.

2. The apparatus of claim 1, wherein the layer generating unit sets a depth of the layer to a predetermined depth.

3. The apparatus of claim 2, wherein the cube space setting unit sets space corresponding to a hexahedron in which a maximum plane positioned at the maximum depth is opposed to a minimum plane positioned at the minimum depth according to the camera intrinsic parameters as the cube space.

4. The apparatus of claim 3, wherein the layer editing unit changes depths of the maximum plane and the minimum plane according to plane translation input requesting for changing depth of at least one of the maximum plane and the minimum plane, and re-sets the cube space to be corresponded to the maximum plane and the minimum plane.

5. A method for generating a depth map, comprising:
   setting cube space based on camera intrinsic parameters;
   extracting objects from a planar image and generating a layer including each object;
   applying at least one of parallel translation and rotation in a depth direction for the layer based on at least one of translation input and rotation input;

placing a model on the layer and setting a depth value for a model area placed on an object area included in the layer as a depth value of the object; and generating a depth map comprising the depth value corresponding to each layer.

6. The method of claim 5, further comprising setting a depth of the layer to a predetermined depth.

7. The method of claim 6, wherein the step for setting cube space based on camera intrinsic parameters comprises setting space corresponding to a hexahedron in which a maximum plane positioned at the maximum depth is opposed to a minimum plane positioned at the minimum depth according to the camera intrinsic parameters as the cube space.

8. The method of claim 7, further comprising changing depths of the maximum plane and the minimum plane according to plane translation input requesting for changing depth of at least one of the maximum plane and the minimum plane, and re-setting the cube space to be corresponded to the maximum plane and the minimum plane.

* * * * *